Patented Mar. 10, 1925.

1,529,277

UNITED STATES PATENT OFFICE.

OTTO C. ROHDE, OF TOLEDO, OHIO, ASSIGNOR TO CHAMPION SPARK PLUG COMPANY, OF TOLEDO, OHIO, A CORPORATION OF DELAWARE.

HEAT-RESISTING ALLOY.

No Drawing. Application filed August 24, 1923. Serial No. 659,231.

*To all whom it may concern:*

Be it known that I, OTTO C. ROHDE, a citizen of the United States, and a resident of Toledo, in the county of Lucas and State of Ohio, have invented a new and useful Heat-Resisting Alloy, which invention is fully set forth in the following specification.

My invention has for its object to produce an alloy or mixture of metals that will withstand high temperatures in the presence of a decomposing agent, such as atmospheric oxygen. It provides a heat resisting metalliferous material that may be used in a great variety of apparatus where material is to be subjected to high temperatures in the presence of air. The material is thus particularly adapted for use in spark or arc electrodes and in electrical resistance units and for heating wires.

One of the greatest difficulties encountered in the use of resistance and electrical elements is the oxidization, corrosion, burning away or pitting in the use of the metals composing the same. This particularly occurs where the elements are subjected to a high temperature.

My invention provides an alloy or mixture of metals of such a character that deterioration at high temperature, notwithstanding the presence of a decomposing agent, will be entirely avoided.

The refractory materials that will conduct electricity and which embody my invention are formed chiefly of nickel or of cobalt. In order to broadly describe either of these metals they are hereinafter referred to as nickel-cobalt metal. Manganese is also used in the mixture, which cooperates with the nickel-cobalt metal to increase its refractory character. A deoxidizing agent of any character in the form of silicon or aluminum may be added to the mixture of nickel and manganese in order to reduce or prevent oxidization of the other elements of the alloy when the alloy is formed and the bodies are molded or shaped. Also a catalyst of any suitable kind may be added to the nickel or cobalt and manganese, or to the nickel or cobalt, manganese and the deoxidizing agent. The catalyst may be zirconium, thorium, caesium, uranium or titanium. The catalyst operates to cause the union of gases in contact with the electrical element. Thus when the alloy is embodied in electrodes of a spark plug, the catalyst will cause the union of the oxygen of the air and the carbon of the gasoline and pre-heat the mixture about the terminals, and so that when the spark occurs, ignition of the gasoline will be assured.

The amount of the nickel-cobalt metal used in making up the composition may be varied from 90% to 97% of the mixture. The manganese may be said from 2% to 6%. The deoxidizing agent, such as silicon, may be varied from .75% to 1.25%, and the catalyst may be varied from .075% to .125%. These varying proportions will give varying degrees of the physical properties of the alloy, but mixtures formed from any of the proportions within the limitations named, will produce substantially similar results.

The ingredients and proportions preferably employed in practice in an alloy for spark plug electrodes are—

|  | Per cent. |
|---|---|
| Nickel | 96 to 97 |
| Manganese | 2 to 2.5 |
| Silicon | .75 to 1.25 |
| Zirconium | .075 to .125 |

The ingredients are mixed together in any suitable way. Preferably they are somewhat finely broken or divided and placed together in a suitable crucible or other container and subjected to a high temperature, such as that of an electric furnace. Any suitable furnace, however, may be used. The ingredients are raised to a temperature in the neighborhood of 3,000° Fahr., whereupon the materials are thoroughly mixed or alloyed together. The alloy or mixture may then be poured either to cast the electrical elements or units to be formed from the alloy, or the alloy may be drawn or rolled or pounded into shape.

I claim:

1. An engine ignition electrode consisting of a metal alloy, comprising nickel-cobalt metal, small amounts of manganese and a small amount of a metal catalyst for pre-heating the alloy when in the presence of carbonaceous material, the nickel-cobalt metal predominating in quantity.

2. An electrode for spark plugs consisting of a heat resisting metal alloy, comprising nickel-cobalt metal, and small amounts of manganese and zirconium, the zirconium acting as a catalyst on carbonaceous material in the presence of oxygen, and the nickel-cobalt metal predominating in quantity.

3. A spark plug electrode consisting of a heat resisting metal alloy, comprising nickel-cobalt material and small amounts of manganese, silicon and zirconium, the zirconium acting as a catalyst in the presence of carbonaceous material and oxygen and the nickel-cobalt metal predominating in quantity.

4. A refractory electrode containing 90% to 97% of nickel, 2% to 6% of manganese and about 1% of a metal catalyst, the catalyst operating in the presence of carbonaceous material and oxygen to produce a reaction between the carbonaceous material and the oxygen.

5. An electrode for spark plugs containing 90% to 97% of nickel, 2% to 6% of manganese, 1% of silicon and .1% of zirconium, the zirconium acting as a catalyst in the presence of carbonaceous material and oxygen.

In witness whereof I have hereunto signed my name to this specification.

OTTO C. ROHDE.